(12) United States Patent
Johnson

(10) Patent No.: US 6,386,549 B1
(45) Date of Patent: May 14, 2002

(54) MULTIPLE LAYER GASKET HAVING SELECTIVELY REMOVABLE SPACER LAYERS

(75) Inventor: William A. Johnson, Naperville, IL (US)

(73) Assignee: Dana Corporation, Toledo, OH (US)

( * ) Notice: Subject to any disclaimer, the term of this patent is extended or adjusted under 35 U.S.C. 154(b) by 0 days.

(21) Appl. No.: 09/328,746

(22) Filed: Jun. 9, 1999

(51) Int. Cl.⁷ .............................. F16J 15/08; F02F 11/00
(52) U.S. Cl. .................... 277/592; 277/591; 277/601
(58) Field of Search .......................... 277/591, 592, 277/608, 627, 601

(56) References Cited

U.S. PATENT DOCUMENTS

| | | | | |
|---|---|---|---|---|
| 2,034,610 A | * | 3/1936 | Dickson | 277/601 |
| 2,071,322 A | * | 2/1937 | Balfe | 277/608 X |
| 2,072,862 A | * | 3/1937 | Balfe | 277/592 |
| 2,089,254 A | * | 8/1937 | Fitzgerald | 277/592 X |
| 2,114,442 A | * | 4/1938 | Fitzgerald | 277/592 X |
| 2,157,102 A | * | 5/1939 | Victor et al. | 277/601 |
| 3,396,711 A | | 8/1968 | Fangman et al. | 123/193.3 |
| 3,738,558 A | * | 6/1973 | Colwell | 277/592 |
| 3,885,889 A | | 5/1975 | Bares et al. | 417/274 |
| 3,939,892 A | * | 2/1976 | Farnam et al. | 277/592 X |
| 4,050,479 A | * | 9/1977 | Baumann | 138/42 |
| 4,211,205 A | | 7/1980 | Lockhart | 277/591 X |
| 4,300,273 A | * | 11/1981 | Lockhart | 29/888.3 |
| 4,776,073 A | * | 10/1988 | Udagawa | 277/592 X |
| 5,161,809 A | * | 11/1992 | Matsushita et al. | 277/601 |
| 5,213,344 A | * | 5/1993 | Udagawa | 277/592 X |
| 5,368,315 A | * | 11/1994 | Viksne | 277/592 |
| 5,582,415 A | * | 12/1996 | Yoshida et al. | 277/592 |
| 5,938,208 A | * | 8/1999 | Yoshida et al. | 277/592 |
| 6,070,882 A | * | 6/2000 | Abe et al. | 277/592 |

* cited by examiner

Primary Examiner—Robert G. Santos
(74) Attorney, Agent, or Firm—Rader, Fishman & Grauer PLLC

(57) ABSTRACT

A multi-layered gasket for a combustion engine having a plurality of active and spacer gasket layers that are removably secured together is disclosed. The active layers are arranged in face-to-face engagement with the spacer layers in an alternating manner. The spacer layers may be selectively removed or added to vary the compression ratio of the engine. Alternatively, spacer layers may be selectively substituted with additional spacer layers having differing thincknesses to selectively vary the compression ratio of the engine. Retaining mechanisms for removably securing the gasket layers together are also disclosed.

21 Claims, 2 Drawing Sheets

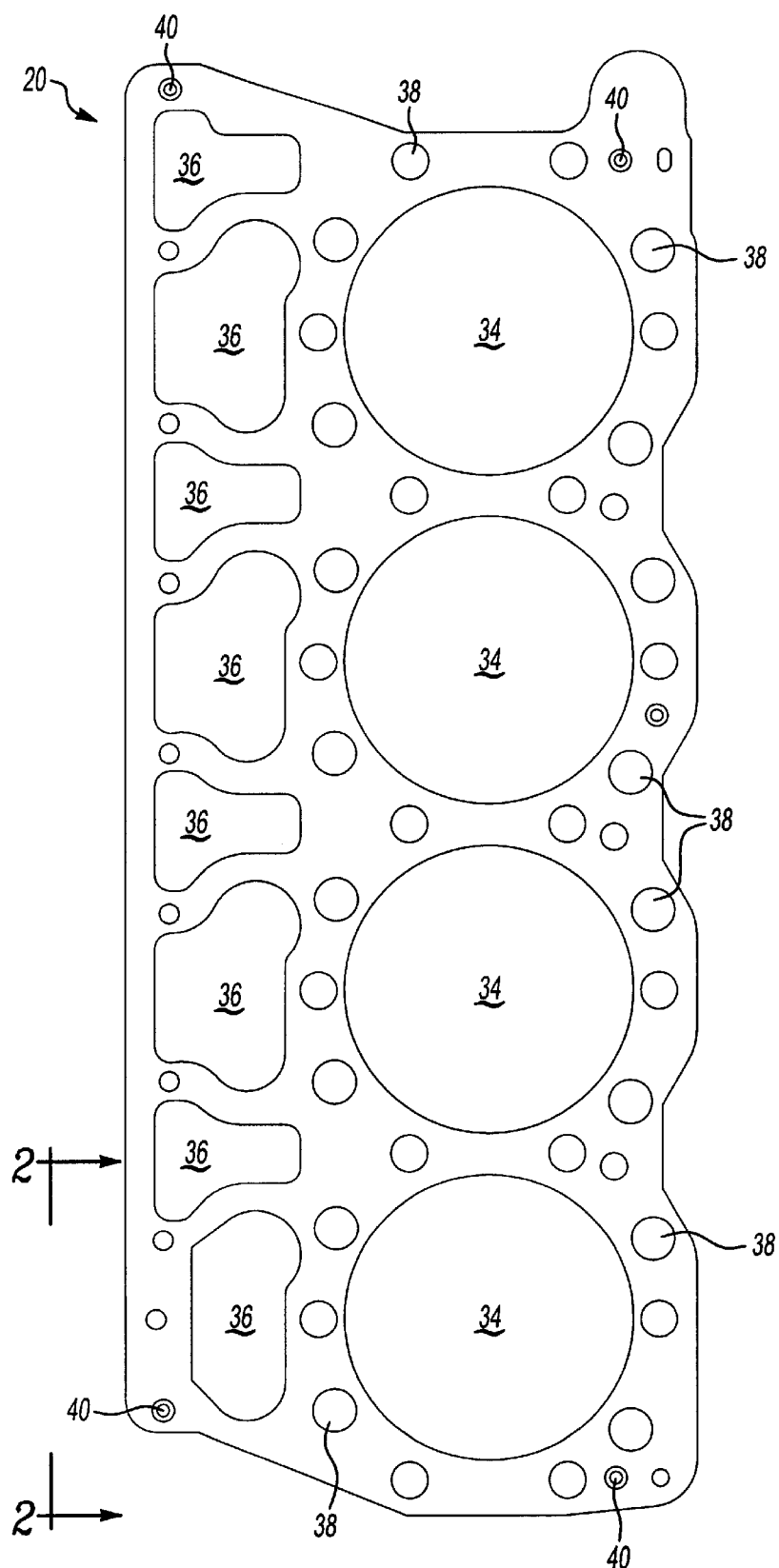
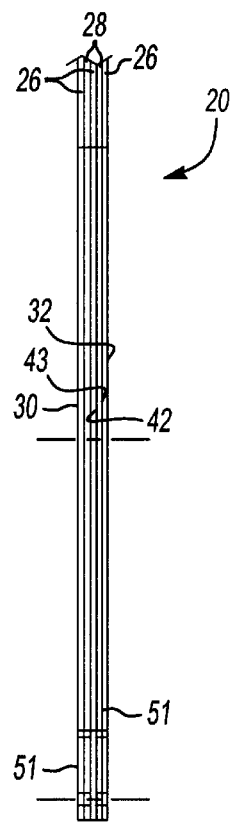
Fig-1
Fig-2

MULTIPLE LAYER GASKET HAVING SELECTIVELY REMOVABLE SPACER LAYERS

FIELD OF THE INVENTION

The present invention relates to a multiple layer steel laminate gasket. More particularly, the invention relates to a multiple layer steel laminate gasket having a plurality of spacer layers sandwiched in an alternating manner between active layers, wherein the spacer layers may be selectively removed or substituted with additional spacer layers to vary the compression ratio of a combustion engine.

BACKGROUND OF THE INVENTION

Gaskets are often used to seal mating mechanical components. In one common application, a cylinder head gasket for an internal combustion engine is formed from a plurality of metallic gasket layers laminated together, with the gasket being positioned between the engine block and cylinder head of an internal combustion engine. The gasket layers are designed to have a predetermined composite thickness to maintain a desired combustion ratio for the engine. The gasket layers are typically permanently secured together by welding or adhesive to provide a single gasket unit that is mounted between the engine block and cylinder head in one assembly step. Gaskets of this type are undesirable as there is no means for selectively removing gasket layers to cost-effectively increase or decrease the overall thickness of the gasket such that the compression ratio of the engine may be modified. Accordingly, to modify the compression ration of the engine a new gasket assembly is required, or the engine components must be redesigned.

Therefore, there is exists a need for a gasket assembly that may be selectively modified to selectively vary the overall thickness of the gasket to modify the compression ratio of an internal combustion engine.

SUMMARY OF THE INVENTION

The present invention is directed to a multiple layer gasket for sealing mating components in a combustion engine, wherein the overall thickness of the gasket assembly may be selectively varied to modify the compression ratio of the engine.

The gasket assembly has at least two active layers and at least one spacer layer. The active layers are preferably constructed of spring steel such that the active layers deforms upon compression to seal cracks and voids in contacting surfaces. The spacer layers serve to maintain the proper thickness of the gasket assembly.

The active and spacer layers are each provided with a plurality of corresponding apertures extending therethrough. The apertures of the respective gasket layers are positioned to be aligned with one another, as well as with corresponding apertures in the mating mechanical components being sealed, when the gasket assembly is fully assembled and positioned between the mating mechanical components. In a preferred embodiment, the active layers are positioned so as to be in contact with the mating mechanical components, while the spacer layers are sandwiched between adjacent active layers, such that the active layers may seal cracks and voids on mounting surfaces of the mating components, as well as sealing against imperfections on the surfaces of the spacer layers. In accordance with the invention, one or more spacer layers may be selectively added or removed from the gasket assembly to selectively lower or increase the compression ratio of the engine, respectively. Alternatively, one or more spacer layers can be substituted with one or more additional spacer layers that have thicknesses that differ from the spacer layers positioned within the gasket assembly to selectively lower or increase the compression ratio of the engine. When it is desired to lower the compression ratio of the engine, spacer layers are either added or removed and substituted with additional spacer layers that have thicknesses that are greater than those being removed. Conversely, to increase the compression ratio, spacer layers are simply removed from the gasket assembly or spacer layers are removed and substituted with additional spacer layers having thicknesses that are less than the thicknesses of the spacer layers being removed. To achieve the maximum compression ratio for the engine, all of the spacer layers may be removed to provide a gasket assembly having a minimum thickness defined by the active layers.

In accordance with another aspect of the invention, the active layers and spacer layers are removably secured together with retaining mechanisms to permit selective addition or removal of the spacer layers. In one embodiment, the retaining mechanisms include removable fasteners that extend through aligned retaining apertures formed in the active and spacer layers. Preferably, the retaining apertures are positioned adjacent a peripheral edge of the gasket layers such that the removable fasteners will not contact the mating components when the gasket assembly is positioned therebetween. Thus, sealing effectiveness will not be compromised.

In an alternative embodiment, the gasket layers are provided with aligned nesting depressions to removably secure and align the gasket layers. The nesting depressions are formed in bottom faces of the respective active and spacer layers such that an apex extends upwardly from top faces of the active and spacer layers. The apex of each nesting depression is receivable within a nesting depression of an adjacent gasket layer such that adjacent layers will be prevented from sliding apart and the gasket layers are maintained in alignment. The nesting depressions are preferably formed adjacent to or along the peripheral edge of the gasket layers such that the apex of the nesting depressions do not compromise sealing effectiveness of the gasket assembly when the gasket assembly is positioned between the mating components.

The use of the gasket assembly of the present invention permits quick and cost-effective modification of the compression ratio of an engine without having to provide a new gasket assembly or modify the engine components by adding or removing spacer layers or substituting the spacer layers with additional spacer layers of varying thicknesses.

BRIEF DESCRIPTION OF THE DRAWINGS

The features and inventive aspects of the present invention will become more apparent upon reading the following detailed description, claims, and drawings, of which the following is a brief description:

FIG. 1 is a plan view of a multiple-layer metallic gasket assembly in accordance with the present invention.

FIG. 2 is a cross-sectional view of the gasket assembly, taken along lines 2—2 of FIG. 1.

DETAILED DESCRIPTION OF PREFERRED EMBODIMENTS

Figure 3:
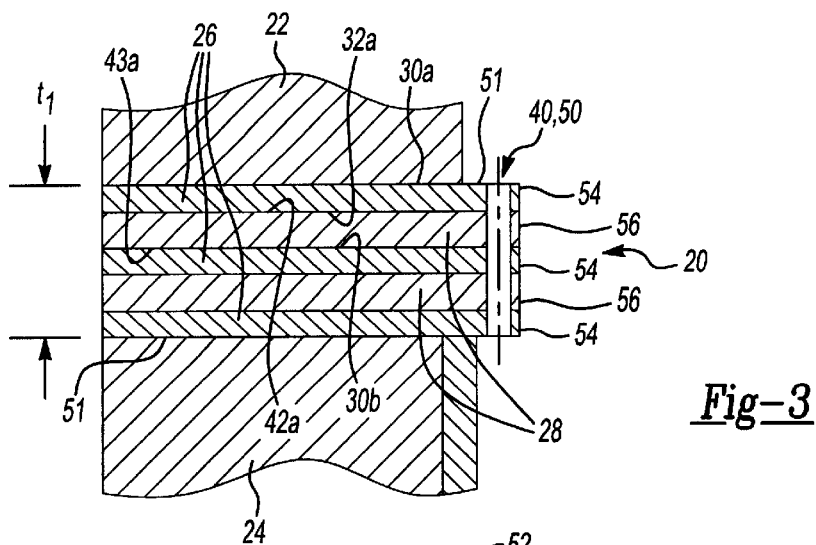
FIG. 3 is an enlarged partial cross-sectional view of the gasket assembly positioned between mating mechanical components.

FIGS. 1–5 disclose a multiple layer gasket assembly 20 for sealing mating mechanical components 22 and 24 (as best seen in FIG. 3). In the disclosed embodiment, gasket assembly 20 is a cylinder head gasket assembly used for sealing a cylinder head 22 and an engine block 24. However, the present invention is not limited to cylinder head gaskets and it may be used with other gasket applications. Because seals on cylinder head gasket assemblies must withstand high temperatures, the gasket assembly 20 is generally preferably formed predominantly from metal, and includes multiple metallic gasket layers. The metallic gasket layers of the gasket assembly 20 are sized and shaped to fit and seal a corresponding mating surface.

Figure 4:
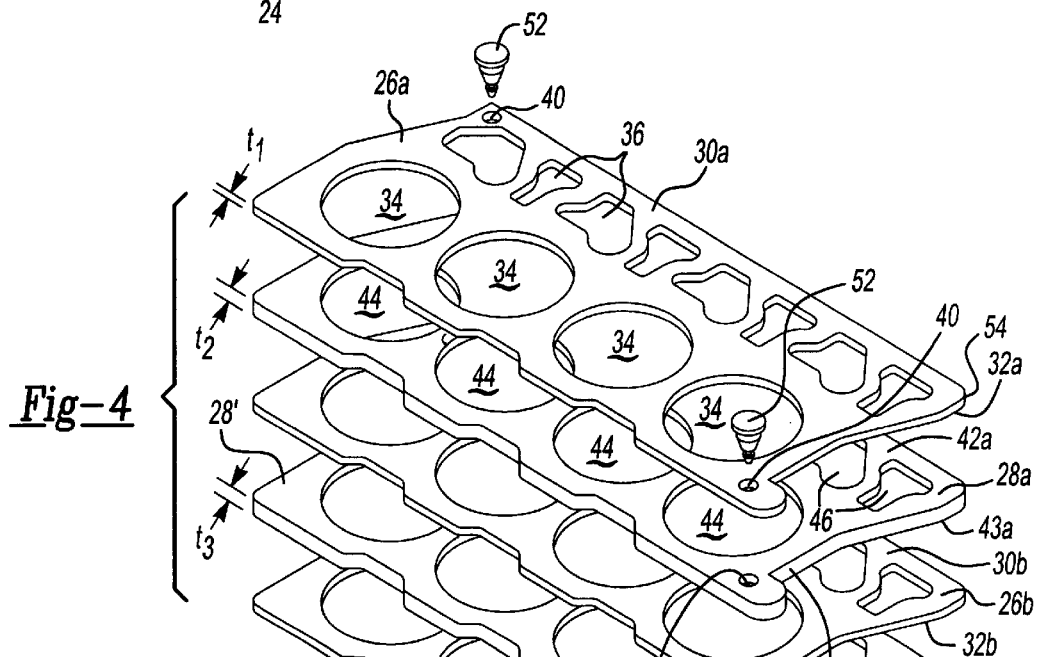
FIG. 4 is a partially exploded view of the gasket assembly provided with a removable retaining mechanism in accordance with the present invention.

Gasket assembly 20 has at least two active gasket layers 26 and at least one spacer gasket layer 28 disposed therebetween that each have corresponding lengths that are slightly longer than the overall length of mating components 22 and 24. However, gasket assembly 20 may include more than two active layers 26 and more than one spacer layer 28. As best seen in FIG. 4, active layers 26 include opposing top and bottom faces 30 and 32 that define a thickness $t_1$. It is preferred that active layers 26 all have the substantially the same thickness $t_1$ such that active layers 26 may be mass-produced in a cost-effective manner. A plurality of apertures 34, 36, 38 and 40 are formed through active layers 26. Apertures 34, 36, 38 and 40 include: cylinder bore openings 34, oil and water ports 36, bolt holes 38 and retaining apertures 40. Retaining apertures 40 will be explained in further detail below.

Similar to active layers 26, spacer layers 28 include opposing top and bottom faces 42 and 43 that define a thickness $t_2$. Thickness $t_2$ may be greater than, less than or equal to thickness $t_1$ of active layer 26. Further, unlike active layers 26, each spacer layer 28 may have different thicknesses $t_2$, as will be explained in greater detail below. A plurality of apertures 44, 46, 48 and 50, which correspond to apertures 34, 36, 38 and 40 of active layers 26, are formed through spacer layers 28.

Active layers 26 and spacer layers 28 are arranged in face-to-face engagement, as seen best in FIGS. 3 and 4, with apertures 34, 36, 38 and 40 of active layers 26 aligned with apertures 44, 46, 48 and 50 of spacer layers 28. Active layers 26 are preferably constructed of spring steel or other suitable resilient material such that when active layers 26 contact mating surfaces of spacer layers 28 or mating components 22 and 24, active layers 26 will easily compress to seal voids, cracks and other imperfections. Accordingly, it is preferred that spacer layers 28 are arranged in an alternating manner with active layers 26, with two active layers 26 positioned so as to define outermost mounting surfaces 51 for gasket assembly 20. For example, referring to FIGS. 3 and 5, top face 30a of active layers 26a contacts mating component 22. Bottom face 32a of active layer 26a contacts top face 42a of spacer layer 28a. Top face 30b of active layer 26b contacts bottom face 43a of spacer layer 28a, such that spacer layers 28 are sandwiched between adjacent active layers 26.

Once assembled and positioned between mating components 22 and 24, the gasket assembly is defined by an overall installed thickness $T_1$. Active layers 26, which are operatively positioned in contact with mating components 22 and 24, easily compress to seal voids in mating components 22 and 24 and adjacent spacer layers 28. Spacer layers 28, typically constructed to steel, maintain the proper thickness $T_1$ of gasket assembly to define the compression ratio of the combustion engine, as will be explained below in greater detail.

Once active layers 26 and spacer layers 28 are properly aligned and assembled in face-to-face engagement, it is preferred that removable fasteners 52 are positioned through aligned retaining apertures 40 and 50, respectively. Removable fasteners 52 removably secure gasket assembly 20 together as a single gasket, while maintaining the proper alignment of gasket assembly 20. Removable fasteners 52 may include push pin assemblies, as featured in FIG. 4, wherein a push pin extends through the aligned retaining apertures 40 and 50 and a push nut removably secures active layers 26 and spacer layers 28 together into a single gasket unit. Thus, quick and easy assembly between mating components is achieved while insuring proper alignment of gasket layers 26 and 28. Other suitable removable fasteners 52, such as bolt assemblies are also contemplated. It is preferred that retaining apertures 40 and 50 are positioned adjacent to a peripheral edge 54 and 56 of active and spacer layers 26 and 28, so as not to be disposed between mating components 22 and 24, respectively. Therefore, sealing effectiveness of gasket assembly 20 is not compromised by removable fasteners 52.

Figure 5:
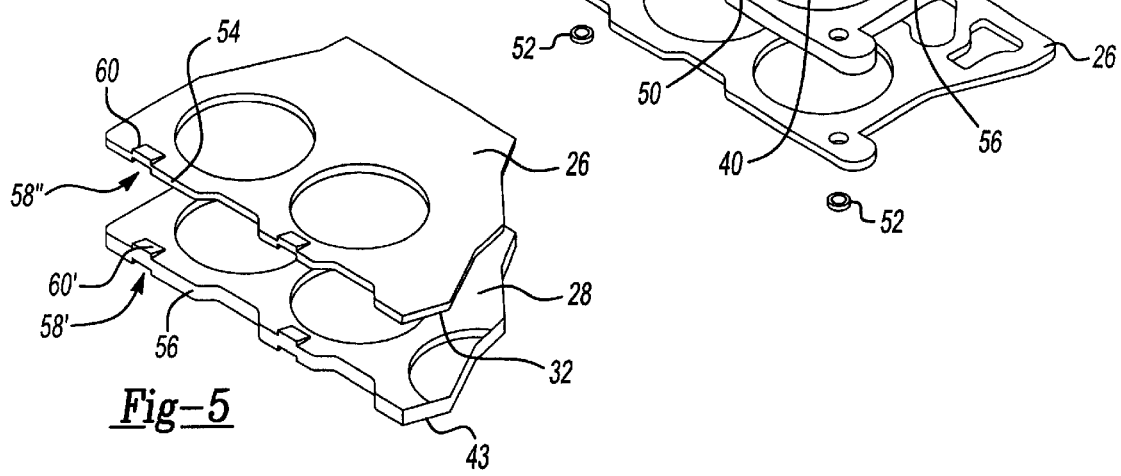
FIG. 5 is a partially exploded view of the gasket assembly provided with an alternative retaining mechanism in accordance with the present invention.

In an alternative embodiment, active layers 26 and spacer layers 28 may be provided with nesting depressions 58, as best seen in FIG. 5, to selectively secure and align successive layers 26 and 28 together, thereby eliminating the need for additional fasteners. Nesting depressions 58 are preferably formed in bottom faces 32 and 43 of active and spacer layers 26 and 28, respectively, and have an apex 60 that extends upwardly from top surfaces 30 and 42 of active and spacer layers 26 and 28 respectively such that successive active layers and spacer layers may be stacked upon one another during assembly. In accordance with the invention, apex 60' of nesting depression 58' of a spacer layer 28 is receivable within nesting depression 58" of adjacent active layer 26, such that successive layers are stacked upon one another in proper alignment while secured against sliding apart. As with retaining apertures 40 and 50, respectively, it is preferred that nesting depressions 58 are formed along or adjacent to the peripheral edges 54 and 56 of active and spacer layers 26 and 28, respectively, such that nesting depressions do not compromise the sealing effectiveness of gasket assembly 20. While nesting depressions 58 are shown having a triangular cross-sectional shape, it is understood that any shape may be employed. Further, it is understood that nesting depressions 58 may be used alone or in combination with removable fasteners 52.

Removable fasteners 52 and nesting depressions 58 advantageously permit quick and easy assembly and disassembly of gasket assembly 20. In accordance with the present invention, selective assembly/disassembly is desired to allow spacer layers 28 to be selectively added or removed to vary the compression ratio of the engine. In turbo-charged engines that have limited performance capabilities, it is often desired to lower the compression ratio of the engine to generate a "boost" for the turbo of the engine. Accordingly, to cost effectively lower the compression ratio without having to provide a new gasket assembly or modify the engine components, removable fasteners 52 are removed from gasket assembly 20, or nesting depressions 58 are disengaged from one another, thereby permitting quick and easy disassembly of gasket assembly 20. Once disassembled, one or more additional spacer layers 28 may be added to gasket assembly 20, thereby increasing the overall thickness $T_1$ of gasket assembly 20, to selectively lower the compression ratio of the engine. Alternatively, one or more spacer layers 28' may be selectively substituted for spacer layers 28, where spacer layers 28' have a thickness $t_3$ that is greater than the thickness $t_2$ of the spacer layer 28 to increase the overall installed thickness $T_1$ of gasket assembly 20. Once spacer layers 28 are added or substituted with spacer layers 28', removable fasteners re-secure active and spacer layers 26 and 28 together.

Conversely, to increase the compression ratio of the engine, spacer layers 28 may be selectively removed in a similar manner or substituted with one or more spacer layers 28' having a thickness $t_3$ that is less than the thickness $t_2$ of spacer layers 28. Further, to achieve a maximum compression ratio for the engine, all of spacer layers 28 may be removed from gasket assembly 20 to such that the overall installed thickness $T_1$ is minimized, being defined by the collective thicknesses of active layers 26.

Preferred embodiments of the present invention have been disclosed. A person of ordinary skill in the art would realize, however, that certain modifications would come within the teachings of this invention. Therefore, the following claims should be studied to determine the true scope and content of the invention.

What is claimed is:

1. A metallic laminate gasket assembly for use in sealing mating components in an internal combustion engine and permitting selective variation of the compression ratio of the engine, said gasket assembly comprising:

at least two metallic active layers, a first active layer and a second active layer, each having a plurality of apertures formed therethrough and a thickness defined by opposing top and bottom faces;

at least one metallic spacer layer having a plurality of apertures formed therethrough and a thickness defined by opposing top and bottom faces, said apertures of said at least one spacer layer corresponding to said apertures of said active layers;

each active layer being selectively arranged in face-to-face engagement with at least one of said at least one spacer layer with two of said active layers serving as outmost mounting surfaces of said gasket assembly such that said bottom face of a first active layer is removably engaged with said top face of its adjacent spacer layer and a top face of a second active layer is removably engaged with said bottom face of its adjacent spacer layer, wherein said apertures of said respective active layers and said at least one spacer layer are aligned; and wherein said one or more spacer layers may be selectively added or removed in a non-destructive manner from said gasket assembly to selectively vary the compression ratio of the engine.

2. The gasket assembly of claim 1, wherein said thickness of said active layers are all substantially the same.

3. The gasket assembly of claim 1, wherein said thickness of said at least one spacer layers is always greater than said respective thicknesses of said active layers.

4. The gasket assembly of claim 1, wherein said at least one spacer layer is selectively removed in a non-destructive manner and substituted with one or more additional spacer layers that have a thickness that differs from said thickness of said at least one spacer layer being removed, so as to selectively modify the compression ratio of the engine.

5. The gasket assembly of claim 4, wherein when said one or more additional spacer layers have a predetermined thickness that is greater than said thickness of said at least one spacer layer, said compression ratio of the engine is lowered and when said predetermined thickness of said additional one or more spacer layers is less than said thickness of said at least one spacer layer, said compression ratio of the engine is increased.

6. The gasket assembly of claim 1, wherein a maximum compression ratio of the engine is achieved when every one of said at least one spacer layer is removed from said gasket assembly in a non-destructive manner and said active layers are removably connected together.

7. The gasket assembly of claim 1, wherein said at least one spacer layer includes two spacer layers, a first spacer layer and a second spacer layer, said first spacer layer having a thickness that is greater than a thickness of said second spacer layer.

8. The gasket assembly of claim 1, wherein said one or more spacer layers includes at least two spacer layers, said at lest two spacer layers being disposed between said two active layers serving as outmost mounting surfaces of said gasket assembly such that a different spacer layer is positioned adjacent each of said two active layers.

9. The gasket assembly of claim 8, wherein said two or more active layers includes at least a third active layer that is removably positioned between said two spacer layers such that said gasket assembly is arranged in an alternating manner.

10. The gasket assembly of claim 1, further including a retaining mechanism for selectively and removably securing said gasket assembly together into a single unit such that said active layers and spacer layers may be selectively added and removed in a non-destructive manner.

11. The gasket assembly of claim 10, wherein said retaining mechanism includes at least one removable fastener and said apertures of said at least one spacer layer and said active layers include at least one retaining aperture, said removable fastener being receivable within said retaining aperture so as to extend through said retaining aperture to selectively secure said active layers and said at least one spacer layer together into a single gasket.

12. The gasket assembly of claim 11, wherein said retaining apertures are formed adjacent to an outer peripheral edge of said active layers and said at least one spacer layer.

13. The gasket assembly of claim 10, wherein said retaining mechanism includes at least one set of aligned nesting depressions formed on said opposing faces of said active layers and said at least one spacer layer, wherein said nesting depressions of said at least one spacer layer are receivable within said corresponding nesting depressions of said active layers to selectively secure and align said active layers and said at least one spacer layer together into a single gasket.

14. The gasket assembly of claim 13, wherein said nesting depressions are formed along a peripheral edge of said active layers and said at least one spacer layer.

15. The gasket assembly of claim 13, wherein each of said nesting depressions are formed in said bottom faces of said active layers and said at least one spacer layer, each of said nesting depressions having an apex extending upwardly from said top faces of said active layers and said at least one spacer layer.

16. A metallic laminate gasket assembly for use in sealing mating components in an internal combustion engine and permitting selective variation of the compression ratio of the engine, said gasket assembly comprising:

a plurality of metallic active layers, each having a plurality of apertures formed therethrough and a thickness defined by opposing top and bottom faces, wherein said respective thickness of each of said active layers are all substantially the same;

a plurality of metallic spacer layers, each having a plurality of apertures formed therethrough and a thickness defined by opposing top and bottom faces, said apertures of said spacer layers corresponding to said apertures of said active layers, wherein said respective thickness of each of said spacer layers are all substantially different, said active and spacer layers being arranged in face-to-face engagement in an alternating manner with said apertures of said active layers and said spacer layers being aligned, wherein two of said active layers are positioned so as to serve as outermost mounting surfaces of said gasket assembly such that said bottom face of a first active layer is selectively and removably engaged with said top face of its adjacent spacer layer and a top face of a second active layer is selectively and removably engaged with said bottom face of its adjacent spacer layer;

wherein one or more spacer layers may be selectively added to or removed in a non-destructive manner from said gasket assembly to selectively vary the compression ratio of the engine;

wherein one or more additional spacer layers may be selectively removed in a non-destructive manner and substituted for one or more of said spacer layers, wherein said additional spacer layers have a thickness that differs from said thickness of said one or more spacer layers, such that selectively substituting said one or more additional spacer layers serves to selectively vary the compression ratio of the engine; and a retaining mechanism for selectively securing and maintaining alignment of said active and spacer layers together into a single gasket.

17. The gasket assembly of claim 16, wherein said retaining mechanism includes a plurality of removable fasteners and said plurality of apertures of said active and spacer layers include a plurality of retaining apertures, said fasteners being receivable within said retaining apertures so as to extend through said aligned retaining apertures to selectively and removably secure said active and spacer layers together into a single gasket and to permit selective disassembly in a non-destructive manner.

18. The gasket assembly of claim 17, wherein said retaining apertures are formed adjacent to an outer peripheral edge of said active and spacer layers.

19. The gasket assembly of claim 16, wherein said retaining mechanism includes a plurality of sets of aligned nesting depressions formed on said opposing faces of said active and spacer layers, wherein said nesting depressions of said spacer layers are receivable within said corresponding nesting depressions of said active layers to selectively secure and align said active and spacer layers together into a single gasket.

20. A metallic laminate gasket assembly for use in sealing mating components in an internal combustion engine and permitting selective variation of the compression ratio of the engine, said gasket assembly comprising:

a plurality of metallic active layers, each having a plurality of apertures formed therethrough and a thickness defined by opposing top and bottom faces, wherein said respective thickness of each of said active layers are all substantially the same;

a plurality of metallic spacer layers, each having a plurality of apertures formed therethrough and a thickness defined by opposing top and bottom faces, said apertures of said spacer layers corresponding to said apertures of said active layers, wherein said respective thickness of each of said spacer layers are all substantially different, said active and spacer layers being arranged in face-to-face engagement in an alternating manner with said apertures of said active layers and said spacer layers being aligned, wherein two of said active layers are positioned so as to serve as outermost mounting surfaces of said gasket assembly such that said bottom face of a first active layer is selectively and removably engaged with said top face of its adjacent spacer layer and a top face of a second active layer is selectively and removably engaged with said bottom face of its adjacent spacer layer;

wherein one or more spacer layers may be selectively added to selectively lower the compression ratio of the engine, removed in a non-destructive manner to selectively increase the compression ratio of the engine; or selectively substituted with one or more additional spacer layers, said additional spacer layers having a thickness that differs from said thickness of said one or more of said spacer layers, such that selectively substituting one or more of said additional spacer layers serves to selectively vary the compression ratio of the engine; and a plurality of removable fasteners received in aligned retaining apertures of said active and spacer layers and a plurality of sets of nesting depressions formed on opposing faces of said active and spacer layers, said removable fasteners and said sets of nesting depressions serving to selectively secure and maintain alignment of said active and spacer layers together into a single gasket, wherein said removable fasteners may be selectively removed and said nesting depressions selectively disengaged, to permit said spacer layers to be selectively removed in a non-destructive manner from or added to said gasket assembly, or to permit selective substitution of said spacer layers with one or more additional spacer layers to selectively vary the compression ratio of the engine.

21. A metallic laminate gasket assembly kit for use in sealing mating components in an internal combustion engine and permitting selective variation of the compression ratio of the engine, said gasket assembly kit comprising:

at least two metallic active layers, a first active layer and a second active layer, each having a plurality of apertures formed therethrough and a thickness defined by opposing top and bottom faces;

at least one metallic spacer layer having a plurality of apertures formed therethrough and a thickness defined by opposing top and bottom faces, said apertures of said at least one spacer layer corresponding to said apertures of said active layers;

each active layer adapted for being arranged in face-to-face selective and removable engagement with at least one of said at least one spacer layer such that two of said active layers serve as outmost mounting surfaces of said gasket assembly, wherein said bottom face of a first active layer is selectively and removably engaged with said top face of its adjacent spacer layer and a top face of a second active layer is selectively and removably engaged with said bottom face of its adjacent spacer layer, and wherein said apertures of said respective active layers and said at least one spacer layer are aligned; and wherein said one or more spacer layers are adapted to be selectively added or removed in a non-destructive manner from said gasket assembly to selectively vary the compression ratio of the engine.

* * * * *

UNITED STATES PATENT AND TRADEMARK OFFICE
CERTIFICATE OF CORRECTION

PATENT NO. : 6,386,549 B1
DATED : May 14, 2002
INVENTOR(S) : William A. Johnson

It is certified that error appears in the above-identified patent and that said Letters Patent is hereby corrected as shown below:

Column 7,
Line 50, replace "scaling" with -- sealing --.

Signed and Sealed this

Ninth Day of July, 2002

Attest:

JAMES E. ROGAN
Attesting Officer    Director of the United States Patent and Trademark Office